(12) United States Patent  
Turnbull et al.

(10) Patent No.: US 8,112,418 B2
(45) Date of Patent: Feb. 7, 2012

(54) GENERATING AUDIO ANNOTATIONS FOR SEARCH AND RETRIEVAL

(75) Inventors: Douglas Turnbull, La Jolla, CA (US); Luke Barrington, San Diego, CA (US); Ruoran Liu, La Jolla, CA (US); Gert Lanckriet, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 371 days.

(21) Appl. No.: 12/052,299

(22) Filed: Mar. 20, 2008

(65) Prior Publication Data

US 2008/0235283 A1 Sep. 25, 2008

Related U.S. Application Data

(60) Provisional application No. 60/896,216, filed on Mar. 21, 2007.

(51) Int. Cl.
*G06F 7/00* (2006.01)
*G06F 17/30* (2006.01)

(52) U.S. Cl. ......... 707/736; 707/711; 707/740; 707/741

(58) Field of Classification Search .................. 707/711, 707/740, 741, 736
See application file for complete search history.

(56) References Cited

U.S. PATENT DOCUMENTS

| 5,882,111 A * | 3/1999 | Chen .............................. 700/92 |
| 5,931,680 A * | 8/1999 | Semba ...................... 434/307 A |
| 6,539,395 B1 * | 3/2003 | Gjerdingen et al. .................. 1/1 |
| 2002/0098881 A1 * | 7/2002 | Radom ............................. 463/9 |
| 2003/0041108 A1 * | 2/2003 | Henrick et al. ............... 709/205 |
| 2007/0118546 A1 * | 5/2007 | Acharya ....................... 707/101 |

* cited by examiner

*Primary Examiner* — Charles Lu

(74) *Attorney, Agent, or Firm* — Park, Vaughan, Fleming & Dowler LLP; Steven E. Stopp

(57) ABSTRACT

Embodiments of a computer system to determine one or more annotation items associated with an audio file are described. During operation, the computer system provides an interactive environment in which multiple users listen to the audio file within a time interval. Next, the computer system receives one or more annotation items associated with the audio file from the multiple users. Then, the computer system displays the received one or more annotation items from the multiple users in the interactive environment, thereby enabling the multiple users to provide feedback to a given user in the multiple users.

19 Claims, 12 Drawing Sheets

```
                                                    ┌─ 400
┌─────────────────────────────────────────────────┐
│   SELECT AUDIO FILES ASSOCIATED WITH ONE OR     │
│   MORE ANNOTATION ITEMS FROM A GROUP OF         │
│   AUDIO FILES                                   │
│                      410                        │
└─────────────────────────────────────────────────┘
                        │
                        ▼
┌─────────────────────────────────────────────────┐
│  FOR EACH OF THE AUDIO FILES, DETERMINE A       │
│  GIVEN MODEL FOR A GIVEN AUDIO FILE BASED ON    │
│  A SET OF AUDIO CONTENT ASSOCIATED WITH THE     │
│  GIVEN AUDIO FILE AND THE ONE OR MORE           │
│  ANNOTATION ITEMS, WHERE THE GIVEN MODEL IS     │
│  INDEPENDENT OF MODELS FOR OTHER AUDIO FILES    │
│  IN THE AUDIO FILES, AND WHERE THE GIVEN        │
│  MODEL SPECIFIES A PROBABILISTIC RELATIONSHIP   │
│  BETWEEN THE SET OF AUDIO CONTENT ASSOCIATED    │
│  WITH THE GIVEN AUDIO FILE AND THE ONE OR       │
│  MORE ANNOTATION ITEMS                          │
│                      412                        │
└─────────────────────────────────────────────────┘
                        │
                        ▼
┌─────────────────────────────────────────────────┐
│  COMBINE THE MODELS FOR THE AUDIO FILES INTO    │
│  AN AGGREGATE MODEL                             │
│                      414                        │
└─────────────────────────────────────────────────┘
        │               │
        │               ▼
        │   ┌─────────────────────────────────────────────┐
        │   │  DETERMINE ONE OR MORE ADDITIONAL           │
        │   │  ANNOTATION ITEMS FOR AN ADDITIONAL AUDIO   │
        │   │  FILE THAT IS EXTERNAL TO THE GROUP OF      │
        │   │  AUDIO FILES BASED ON THE AGGREGATE MODEL   │
        │   │               (OPTIONAL)                    │
        │   │                   416                       │
        │   └─────────────────────────────────────────────┘
        │
        ▼
┌─────────────────────────────────────────────────┐
│  IDENTIFY ONE OR MORE AUDIO FILES IN THE        │
│  GROUP OF AUDIO FILES USING THE AGGREGATE       │
│  MODEL IN RESPONSE TO A QUERY PROVIDED BY A     │
│  USER                                           │
│                  (OPTIONAL)                     │
│                      418                        │
└─────────────────────────────────────────────────┘
```

FIG. 4

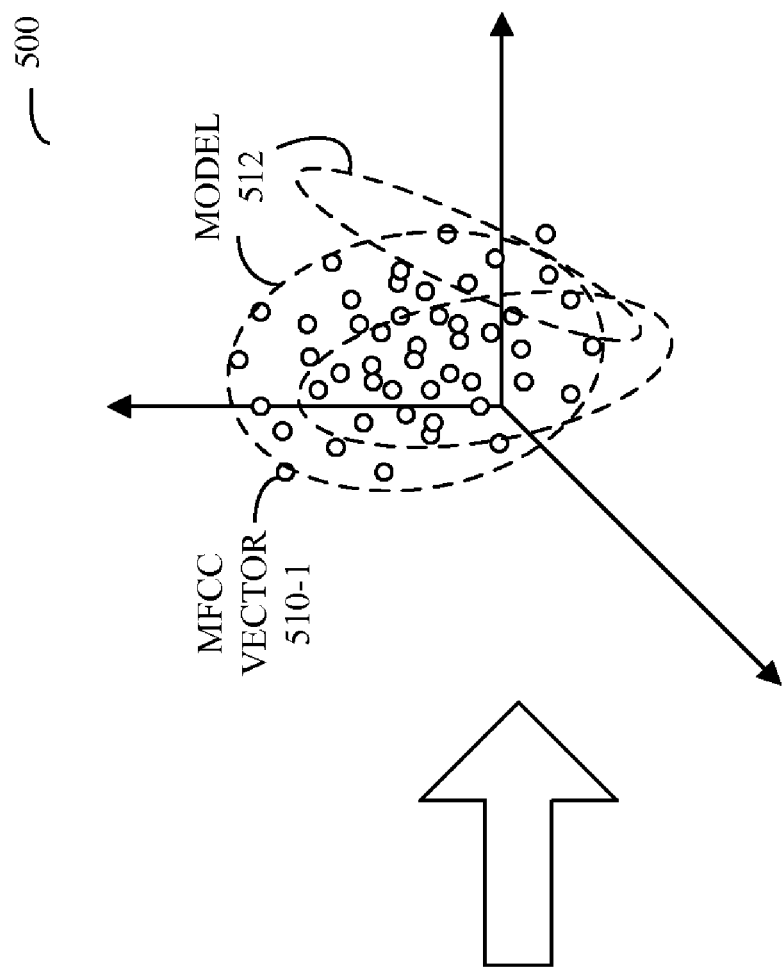
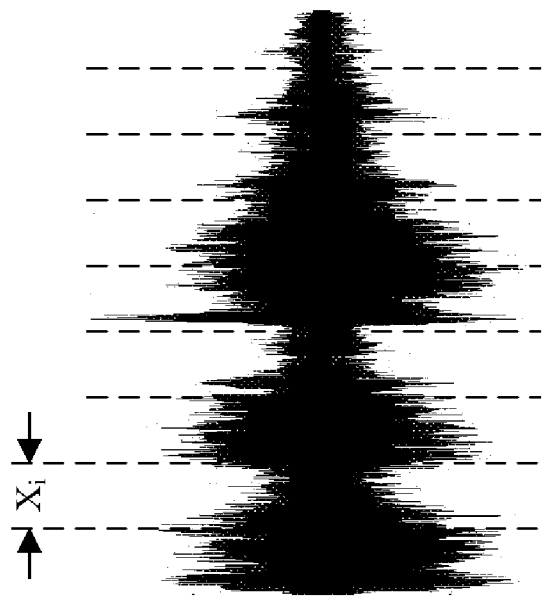
FIG. 5

FIG. 11

SONG 1110-1 — ANNOTATION ITEM 1112-1 | WEIGHT 1114-1 | ANNOTATION ITEM 1112-2 | WEIGHT 1114-2 | ...

SONG 1110-2

AGGREGATE MODEL 1210-1 — COMPONENT 1212-1 | MOMENTS 1214-1 | COMPONENT 1212-2 | MOMENTS 1214-2 | ...

AGGREGATE MODEL 1210-2

...

1200

US 8,112,418 B2

GENERATING AUDIO ANNOTATIONS FOR SEARCH AND RETRIEVAL

CROSS REFERENCE TO RELATED APPLICATIONS

This application claims priority under 35 U.S.C. 119(e) to U.S. Provisional Application Ser. No. 60/896,216, "Generating Audio Annotations for Search and Retrieval," filed on Mar. 21, 2007, the contents of which are herein incorporated by reference.

GOVERNMENT LICENSE RIGHTS

This invention was made with United States Government support under Grant No. DGE-0333451 and Grant No. DMS-MSPA-062540922 awarded by the National Science Foundation. The United States Government has certain rights in the invention.

BACKGROUND

1. Field of the Invention

The present invention relates to techniques for classifying attributes or characteristics of audio files. More specifically, the present invention relates to systems and methods for determining annotation items associated with the audio files, which may be used to determine annotation items for additional audio files and/or to perform searches for information based on queries.

2. Related Art

Digital audio files are an increasingly popular format that is enabling a wide variety of applications. For example, in conjunction with networks (such as the World Wide Web or the Internet), individuals are now able share music files. Moreover, individuals are also able to listen to these music files on a variety of devices, such as cellular telephones and MP3 players. Additionally, libraries of content, such as sound effects, lectures and presentations, can now be used for applications such as movie soundtracks or online education.

These and many other applications leverage the ability to identify and access digital audio content. In turn, these operations are often implemented using search techniques, such as search engines. However, modern search engines are often dependent on the existence of an index of documents, such as digital audio files, that are appropriate classified or indexed in order to facilitate search and retrieval. Unfortunately, it is often difficult to classify audio content in a general way.

Existing techniques for classifying audio content include meta data (such the artist, the song, the album, the year of release, or other non-acoustic descriptions, and, more generally, text, numeric information, or graphical representations) and similarity (such as acoustic similarity). However, these techniques are often difficult to use. For example, classification using meta data often requires every sound in a database to be manually annotated before data can be retrieved, which can take a long time and can be costly. In addition, in order to identify a song based on meta data, a user will often have to know what they are looking for in advance. Thus, if the song has been annotated using the song name, the artist name and the album name, and the user does not recall this information, then the user cannot find that song in the database.

Moreover, attempts to identify a song by similarity, such as by humming, tapping or beatboxing, are often frustrated by the talent necessary and the subjective nature of any resulting matches. While such acoustic-similarity comparisons may also be implemented using collaborative filtering, it is often difficult to interpret the results of these techniques, which can limit the accuracy or usefulness of the results.

Hence what is needed is a technique for classifying audio files by determining annotation items associated with the audio files.

SUMMARY

One embodiment of this invention provides a computer system to determine one or more annotation items associated with an audio file. During operation, the computer system provides an interactive environment in which multiple users listen to the audio file within a time interval. Next, the computer system receives one or more annotation items associated with the audio file from the multiple users. Then, the computer system displays the received one or more annotation items from the multiple users in the interactive environment, thereby enabling the multiple users to provide feedback to a given user in the multiple users.

In some embodiments, the computer system provides a reward to the given user based on agreement between one or more annotation items received from the given user and the one or more annotation items received from other users in the multiple users. This agreement may include agreement with annotation items received from a majority of the other users.

In some embodiments, the one or more annotation items include semantic labels. Moreover, the one or more annotation items may include tags, which include one or more words.

In some embodiments, for the given user, receiving the one or more annotation items involves the given user selecting one or more annotation items from pre-determined annotation items. These pre-determined annotation items may include: types of music, emotions, descriptions of vocals, types of musical instruments, descriptions of musical styles, and/or rhythms. Note that the pre-determined annotation items may be determined from a document associated with the audio file. For example, the document may include a review of the audio file.

In some embodiments, the audio file includes music.

In some embodiments, the computer system repeats the providing, receiving and displaying for additional audio files. Moreover, the computer system may determine an aggregate score for the given user based on the feedback associated with the received annotation items associated with the audio file and the additional audio files. Additionally, the computer system may provide a reward to the given user based on the aggregate score.

In some embodiments, the interactive environment includes a game. Moreover, the interactive environment may be implemented via a network.

In some embodiments, the multiple users are at different geographic locations. Note that the multiple users may concurrently listen to the audio file.

Another embodiment provides a method for determining the one or more annotation items associated with the audio file, which may be performed by the computer system. This method may include at least some of the preceding operations.

In some embodiments, the method is implemented using the computer system. Moreover, signals (such as wireless, wired, or optical signals) associated with at least some of the preceding operations, such as providing the interactive environment, as well as receiving or displaying the one or more annotation items, may be conveyed to or from the computer system and/or the given user by an intermediate party, such as an Internet Service Provider, a wireless service provider and/or a telephone carrier.

Another embodiment provides a computer-program product for use in conjunction with the computer system. This computer-program product may include instructions corresponding to at least some of the preceding operations.

Another embodiment provides a user interface (such as a graphical user interface) for providing the game.

Another embodiment provides another computer system to generate an aggregate model that specifies a probabilistic relationship between one or more annotation items and a set of audio content. During operation, the other computer system selects audio files associated with one or more annotation items from a group of audio files. Then, for each of the audio files, the other computer system determines a given model for a given audio file based on the set of audio content associated with the given audio file and the one or more annotation items. Note that the given model is independent of models for other audio files in the audio files, and that the given model specifies a probabilistic relationship between the set of audio content associated with the given audio file and the one or more annotation items. Next, the other computer system combines the models for the audio files into the aggregate model.

In some embodiments, the one or more annotation items include semantic labels. Moreover, the set of annotation items may include: types of music, emotions, descriptions of vocals, types of musical instruments, descriptions of musical styles, and/or rhythms.

In some embodiments, the other computer system generates additional aggregate models for additional annotation items in a set of annotation items, where the set of annotation items includes the one or more annotation items. Moreover, a given annotation item in the set of annotation items has one or more associated weights (which may be non-zero), where a given weight indicates an association between the given annotation items and the given audio file in the group of audio files. Note that the one or more weights may be determined in an interactive environment in which: multiple users listen to music that includes the group of audio files; provide the one or more annotation items and the additional annotation items in the set of annotation items; and receive feedback in the interactive environment based on the provided set of annotation items.

In some embodiments, the audio files include music.

In some embodiments, the set of audio content for the given audio file includes mel frequency cepstral coefficients.

In some embodiments, the set of audio content for the given audio file are extracted using a series of time windows. Note that the time windows may be independent of each other, thereby eliminating temporal relationships between different time windows.

In some embodiments, the given model is determined using a supervised learning technique, such as a Gaussian mixture model. Moreover, the Gaussian mixture model may include a multivariate Gaussian distribution corresponding to a weighted sum of Gaussian distributions, where the product of a given weight and a given Gaussian distribution specifies a probabilistic relationship between given audio content in the set of audio content and the one or more annotation items.

Additionally, the given model may be determined using an expectation maximization technique. Moreover, the combining of the models may involve a mixture hierarchies expectation maximization technique. This mixture hierarchies expectation maximization technique may include one or more weights associated with the models.

In some embodiments, the other computer system determines one or more additional annotation items for an additional audio file that is external to the group of audio files based on the aggregate model. Moreover, the other computer system may identify one or more audio files in the group of audio files using the aggregate model in response to a query provided by a user.

Another embodiment provides another method for generating the aggregate model that specifies the probabilistic relationship between the one or more annotation items and the set of audio content, which may be performed by the other computer system. This method may include at least some of the preceding operations.

In some embodiments, the other method is implemented using the computer system. Moreover, signals (such as wireless, wired, or optical signals) associated with at least some of the preceding operations may be conveyed to or from the computer system and/or the given user by an intermediate party, such as an Internet Service Provider, a wireless service provider and/or a telephone carrier.

Another embodiment provides a computer-program product for use in conjunction with the other computer system. This computer-program product may include instructions corresponding to at least some of the preceding operations.

BRIEF DESCRIPTION OF THE FIGURES

FIG. 4 is a flowchart illustrating a method for generating an aggregate model that specifies a probabilistic relationship between one or more annotation items and a set of audio content in accordance with an embodiment of the present invention.

FIG. 5 is a drawing illustrating the determining of a model in accordance with an embodiment of the present invention.

FIG. 11 is a block diagram illustrating a data structure in accordance with an embodiment of the present invention.

FIG. 12 is a block diagram illustrating a data structure in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 3A:
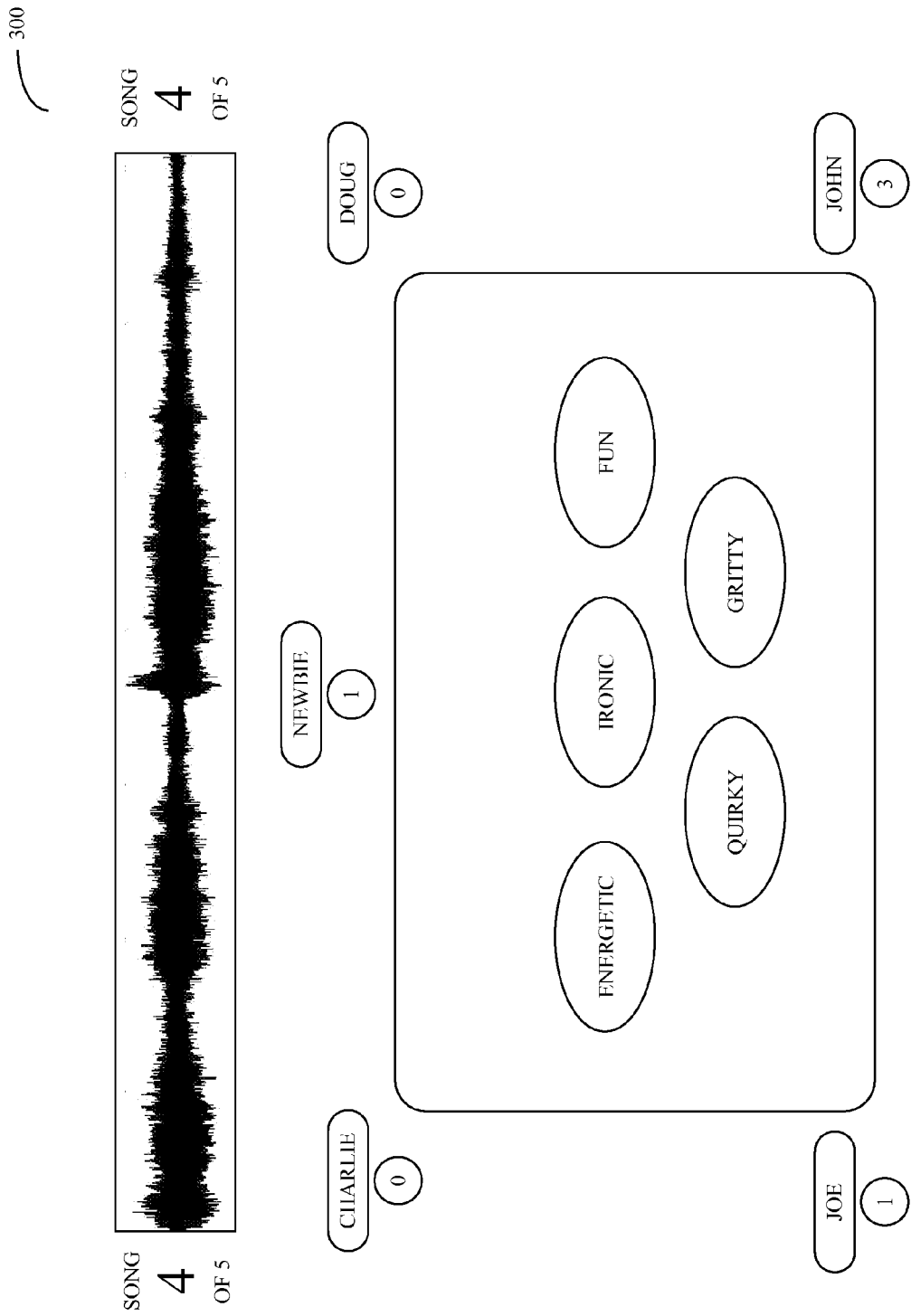
FIG. 3A is a block diagram illustrating a screen shot of a user interface in accordance with an embodiment of the present invention.

Embodiments of a computer system, a method, a user interface and a computer-program product (i.e., software) for use with the computer system are described. These systems, software, and processes may be used to determine one or more annotation items associated with an audio file (such as a song or music), for example, using an interactive environment, such as an online game that may be played by multiple players, who may be at different geographic locations. This is shown in FIG. 3A, which presents a block diagram illustrating a screen shot of a user interface 300. Using this user interface, players may concurrently listen to the audio file and a given player, such as 'newbie,' may select one or more annotation items (for example, 'energetic') that this player feels should be associated with the audio file. Note that the annotation items may include semantic labels, such as: types of music, emotions, descriptions of vocals, types of musical instruments, descriptions of musical styles, when the audio file is played (such as while studying, running or driving), and/or rhythms.

Figure 3B:
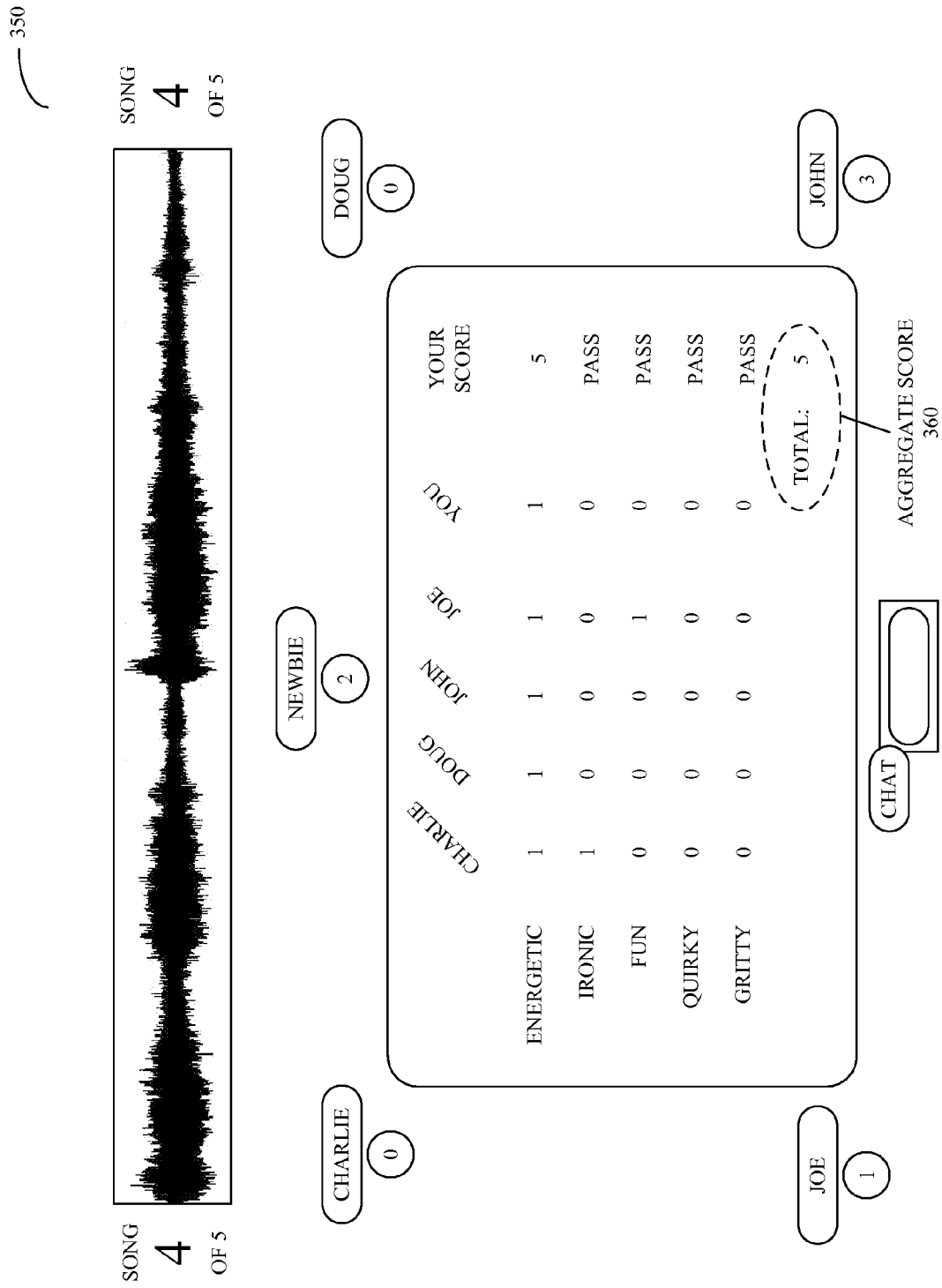
FIG. 3B is a block diagram illustrating a screen shot of a user interface in accordance with an embodiment of the present invention.

As shown in FIG. 3B, which presents a block diagram illustrating a screen shot of a user interface 350, subsequently the results of the players' selections may be displayed, and an aggregate score 360 for the given player may be determined and displayed. Moreover, based on the aggregate scores for the players, one or more winners for the current audio file or a set of audio files may be rewarded based on agreement between the one or more annotation items selected by these winners and those selected by the other players, for example, when the one or more winners' selections agree with those selected by the majority of the other players.

Once annotation items have been associated with a group of audio files, this information may be used to generate an aggregate model that specifies a probabilistic relationship between one or more annotation items and audio content associated with the audio files. In particular, as shown in FIG. 5, which presents a drawing 500, a set of audio content for a given audio file (such as mel frequency cepstral coefficients or MFCCs) may be extracted using a series of time windows, which may or may not be independent of each other (if they are independent, temporal relationships between different time windows are eliminated). Then, MFCC vectors in a multi-dimensional space, such as MFCC vector 510-1, may be fit to the annotation items using a model 512, which specifies a probabilistic relationship between the set of audio content associated with the given audio file and one or more annotation items. For example, the model 512 may be a Gaussian mixture model that includes a weighted sum of one or more multivariate Gaussian distributions, where the product of a given weight and a given Gaussian distribution specifies a probabilistic relationship between given audio content in the set of audio content and the one or more annotation items.

Figure 6:
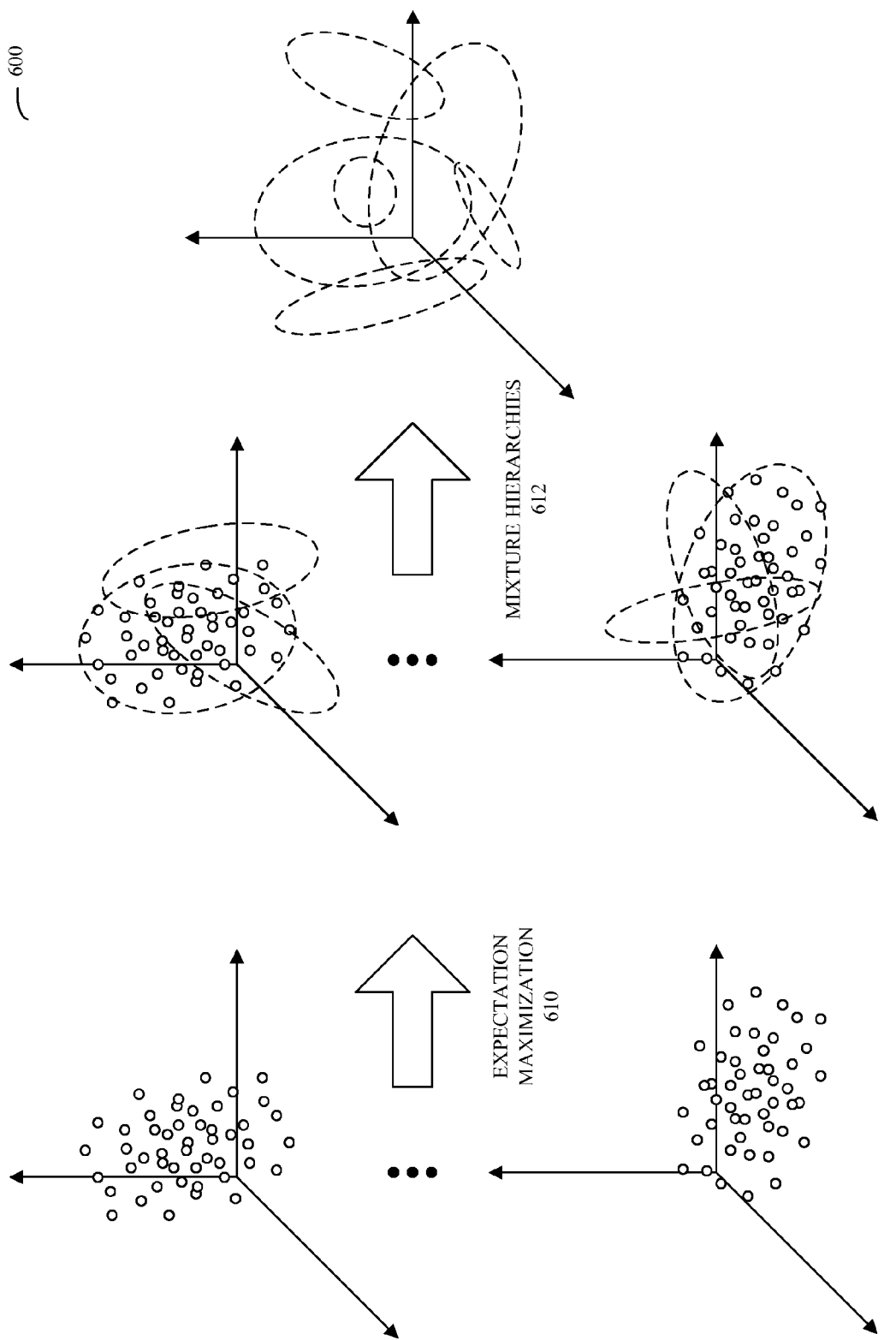
FIG. 6 is a drawing illustrating the combining of models for audio files into an aggregate model in accordance with an embodiment of the present invention.

Moreover, as shown in FIG. 6, which presents a drawing 600, models for the group of audio files may be combined into the aggregate model. In particular, an expectation maximization 610 technique may be used to independently generate models for the group of audio files. Then, these models may be combined into the aggregate model using a weighted mixture hierarchies 612 expectation maximization technique, were the weights are, in general, non-zero.

These operations may be repeated for different groups of audio files in order to generate multiple aggregate models that encompass multiple audio files. As described further below with reference to FIG. 7, subsequently these aggregate models may be used to: determine annotation items for an additional audio file (that was not considered during the game); and/or to identify one or more of the audio files in response to a query provided by user.

In the discussion that follows the audio files may include a variety of acoustic content or information, including: songs, music, sound effects, environmental sounds, speeches, verbal communication, and/or auditory information in a range of frequencies between 25-20,000 Hz. Moreover, the annotation items may include descriptive attributes or characteristics associated with one or more audio files. These annotation items may include: words, text, tags, semantic labels, and/or characters.

Figure 1:
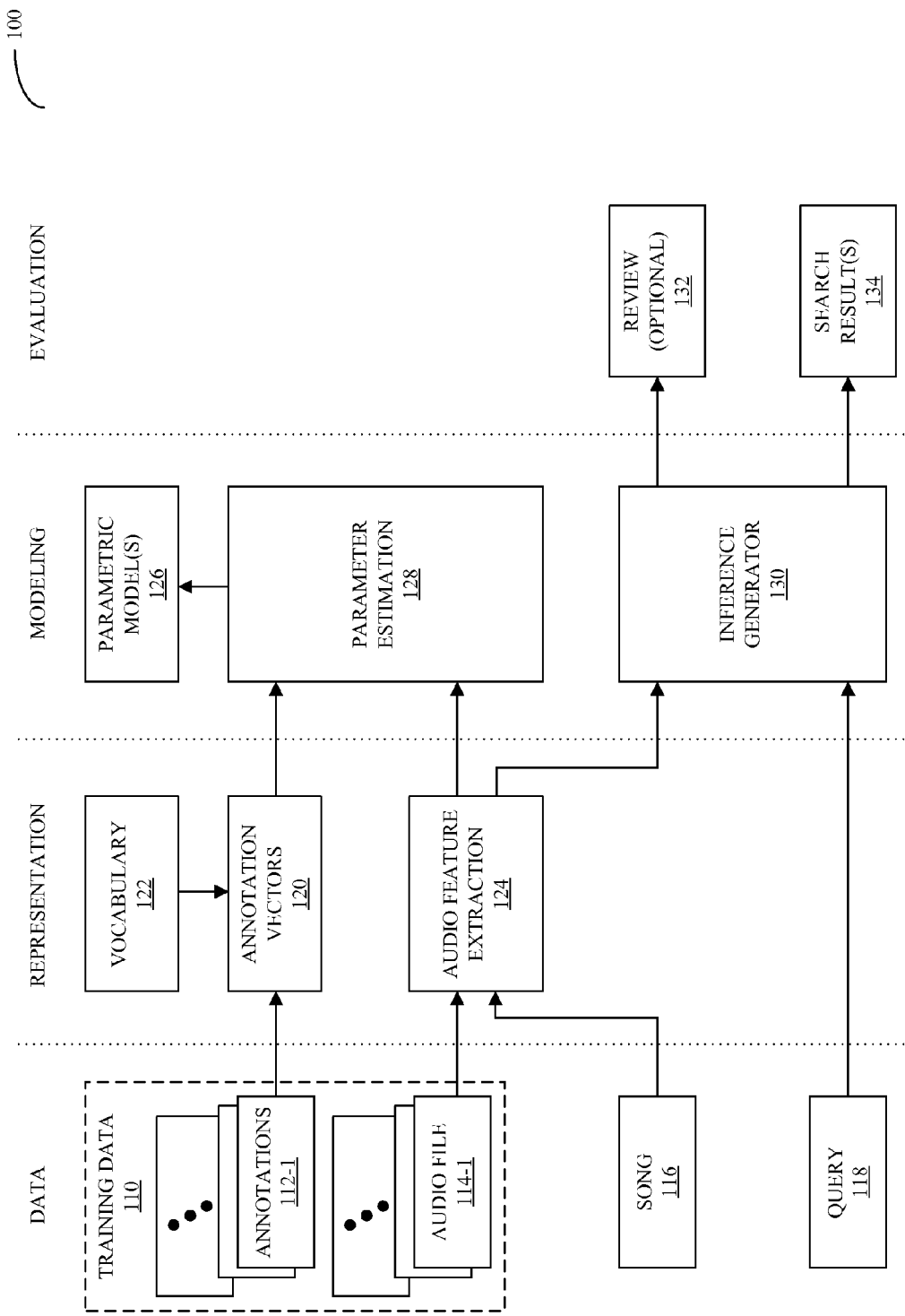
FIG. 1 is a block diagram illustrating a computer system in accordance with an embodiment of the present invention.

We now describe embodiments of systems, devices and processes for determining one or more annotation items associated with an audio file and for generating an aggregate model that specifies a probabilistic relationship between one or more annotation items and a set of audio content. FIG. 1 presents a block diagram illustrating a computer system 100. This computer system enables managing of digital audio files based on reliable semantic audio annotations of audio files, which may be collected using multiplayer, Internet-based games, e.g., using an online system that provides real-time player interaction and scoring (as described further below with reference to FIGS. 3A and 3B).

In some embodiments of the online game, players listen to clips of music and select words that describe the music. These players are assigned points based on how well their selections match those of the other players. By playing the game, users generate annotations or annotation items that can be used to classify music in an index of documents. This index of documents may be used in a variety of audio applications, such as: a search engine (or a retrieval system), a recommendation system, an automatic playlist generator, and/or in a system for music-knowledge discovery.

In particular, training data 110, such as annotation items 112 (which may be determined during one or more online games and/or may be separately determined, for example, using surveys) and associated audio files 114, may be used in computer system 100 to determine a representation. This representation may include annotation vectors 120 in a multi-dimensional space that are determined from the annotation items 112 based on a pre-determined vocabulary 122 of descriptive words, as well as audio features or audio content that are extracted from the audio files 114 during audio feature extraction 124. In an exemplary embodiment, the audio content includes MFCCs. Then, one or more parametric models 126, such as a statistical or probabilistic model that relates audio content and at least some of the annotation items 112, may be trained using the representation during parameter estimation 128 (as described further below with reference to FIGS. 5 and 6).

After parameters for the one or more parametric models 126 have been determined, computer system 100 may be used to facilitate various audio applications. For example, another song 116 may be classified, i.e., annotation items (such as meaningful words) in the pre-determined vocabulary 122 may be selected, based on audio content for the song 116, which is extracted during audio feature extraction 124, and based on the one or more parametric models 126 (as described further below with reference to FIG. 7). This technique is sometimes referred to as automatic annotation. In this way, the index of documents, which includes classified audio files, may be expanded to include additional audio files that were not considered during the online game.

Moreover, the annotation items 112 and the parametric models 126 may be used by inference generator 130 to determine an optional music review 132 by placing the annotation items 112 in a natural language context, such as an automatic 'Rolling Stone magazine' article.

Additionally, the annotation items 112 and the parametric models 126 may be used to provide a recommendation to a user of the computer system 100 (such a recommendation to listen to song 116 based on the determined annotation items for this song). For example, recommendations may be provided to an online community of like-minded listeners who can interact in real-time for a shared music experience. These recommendations may include automatic playlist generation that are based on recommendations of fellow community members (who may be players in the online game), as well as social networking and sharing of opinions and musical preferences.

Similarly, in response to a query 118, such as a text-based search query that is provided by a user in a web browser, inference generator 130 may identify previously classified audio files (which is sometimes referred to as audio search). In particular, inference generator 130 may determine a search expression based on the query 118, and may calculate matching scores for one or more audio files (such as songs) based on the search expression. Based on the matching scores, search results 134 may be identified (as described further below with reference to FIG. 7). Note that the search results 134 may be used by users of the computer system 100 to identify music to purchase, for example, from Apple iTunes™ (from Apple, Inc., of Cupertino, Calif.) or from Amazon.com (from Amazon.com, Inc., of Seattle, Wash.). In the discussion that follows, audio search is understood to include the identification of one or more audio files in an index of documents and/or the providing of recommendations to users.

In some embodiments, the audio search includes personalized search. For example, the user may provide registration information as well as manual annotation items, such as demographic information. Based on this information, the computer system 100 may use one or more parametric models 126 that were trained on similar individuals (such as 12-14 year old girls) to identify search results 134.

Computer system 100 may facilitate: cost effective and accurate collection of annotation items during one or more online games (for example, paid experts may not be required); a scalable index of documents that may, at least in part, be increased using automatic annotation; and personalized services, such as audio search. In contrast with some existing techniques and systems, this approach may allow annotation items to be obtained from the players of the online game, thereby eliminating time consuming and/or costly surveys. Moreover, the annotation items may be accurate and high quality because they are based on agreement among a large number of independent users. Furthermore, the automated annotation offered by computer system 100 allows the index of documents to include an extremely large number of audio files, and allows this index to grow without the constraints imposed by manual annotation. In some embodiments, after seeding the computer system 100 with training data 110, computer system 100 may be able to operate in an automated operation mode (e.g., it may not require additional manually determined annotation items).

In some embodiments the computer system 100 includes fewer or additional components. Moreover, two or more components may be combined into a single component, and/or a position of one or more components may be changed.

Figure 2:
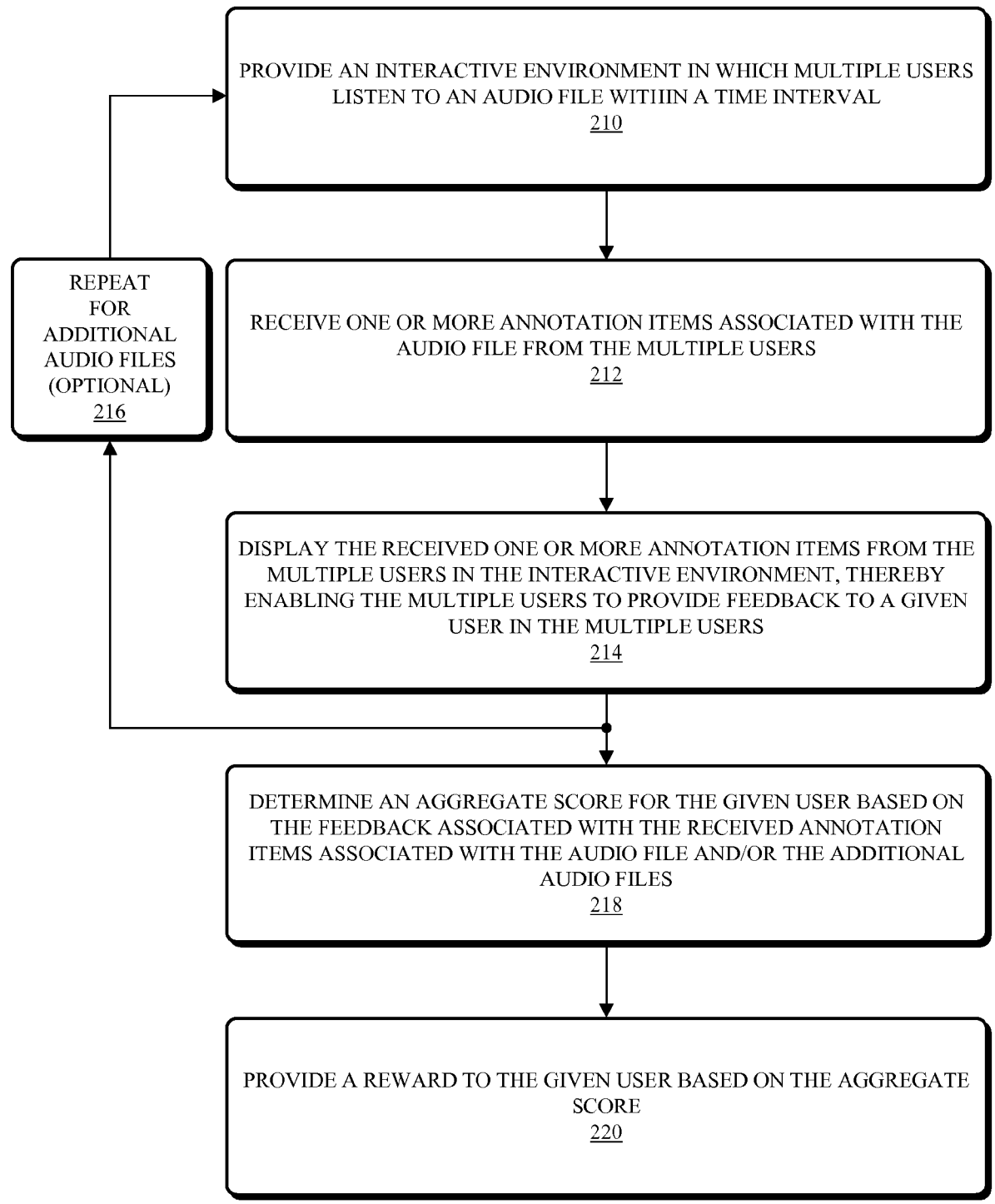
FIG. 2 is a flowchart illustrating a method for determining one or more annotation items associated with an audio file in accordance with an embodiment of the present invention.

We now describe embodiments of a method for determining one or more annotation items associated with an audio file. FIG. 2 presents a flowchart illustrating a method 200 for determining one or more annotation items associated with an audio file, which may be implemented using a computer system. During operation, the computer system provides an interactive environment in which multiple users listen to the audio file within a time interval (210). Next, the computer system receives one or more annotation items associated with the audio file from the multiple users (212). Then, the computer system displays the received one or more annotation items from the multiple users in the interactive environment, thereby enabling the multiple users to provide feedback to a given user in the multiple users (214).

In some embodiments, the computer system optionally repeats the providing (210), the receiving (212) and the displaying (214) for additional audio files (216). Moreover, the computer system may determine an aggregate score for the given user based on the feedback associated with the received annotation items associated with the audio file and/or the additional audio files (218). Additionally, the computer system may provide a reward to the given user based on the aggregate score (220).

Note that in some embodiments of method 200 there may be additional or fewer operations. Moreover, the order of the operations may be changed, and two or more operations may be combined into a single operation.

We now describe embodiments of a user interface (such as a graphical user interface) in more detail. Continuing the discussion of FIG. 3A, audio annotation games can include entertaining computer-based systems where users (e.g., game players) interact in real-time (which can include dynamic feedback, player interaction, scoring, and/or rewards), and which collect useful audio annotation items. For example, to make the games entertaining, they may be easy to use (by using real-time graphical feedback) and may offer interactive competition. These audio annotation games may be played over a communication network (e.g., the Internet), and may be stand-along applications that execute on a client computer or an application that executes in the environment of another program (such as a web browser) on the client computer.

Games may be played by multiple players, some of whom can be simulated or virtual players (for example, using an artificially intelligent computer audition system). Prior to playing, each player creates a profile and logs onto a web server. Note that by storing profiles (e.g., age, gender, nationality, profession, income, favorite type of music or artist, etc.), the annotation items provided by the user may be used to personalize applications implemented by computer system 100 (FIG. 1). For example, as described previously in the discussion of personalized audio search, annotation items from demographically similar users may be aggregated to create personalized search and recommendations based on the registration parameters.

Once logged on, the user is connected to the same game environment as other users. In some embodiments, multiple games (or mirrored games) occur simultaneously. For example, there may be separate sound-effects and music games, or multiple music games, where each game features a different genre of music.

In some embodiments, an instance of the game includes of a fixed number of rounds. One round of the game begins by playing a sound (e.g., music, sound effect, speech, audio file, etc.). As illustrated in user interface 300, during this round a list of pre-determined annotation items, semantic phrases or words that could be used to describe the sound that is playing are displayed (for example, the musical genre, emotional content, instrumentation, usage, etc.). These words may be: from similar semantic categories (e.g., colors, emotions, adjectives, etc.); suggested by other players who have previous listened to the track or sound; and/or randomly selected. In some embodiments, the pre-determined annotation items may be extracted from a document associated with the audio file or sound, such as a music review. Note that in some embodiments users may also provide additional annotation items that are not pre-determined during the game.

During this round, players may select the semantic phrase that best describes the sound that they hear and/or select the phrase that worst describes the sound that they hear. Once a given player has selected the best and/or worst phrase, no further selections may be allowed for that player until the sound has finished playing and the round ends. Continuing the discussion of FIG. 3B, once the players have selected the best and/or worst phrase, they can see the selections made by other players who are also playing the same round. In particular, as the game is played, the players may see instantaneous, real-time graphical feedback of their own selection(s), as well as the selections of all other players.

In some embodiments, a scoring system is used so that the score for a given player for a given round of the game is based primarily on the level of agreement between the phrase(s) selected by the given player and the phrases chosen by other players. Scores may also be influenced by the speed with which the players selected their chosen phrase(s) and other bonus features (e.g., for suggesting alternative words to describe the audio file).

Note that by basing the players' scores on how well or poorly their selections agree with the selections of all other players in the round, players may gain a sense of cooperative and competitive play. Moreover, by rewarding players for selecting words that other players will agree with, the game collects reliable semantic descriptions or annotation items for the audio files used in each round based on the selections of a large number of independent players. Thus, this approach can be used to leverage competition among multiple players to attract human annotators, who, in turn, become skilled at annotating songs.

In an exemplary embodiment of a single round of a game, player A logs onto the game's Internet website from a computer in North America; player B logs onto the game's Internet website from a mobile device in China; and player C logs onto the game's Internet website from a laptop computer in Europe. All of the players may hear a 10-15 second clip of a popular rock-and-roll song via their web browsers. Moreover, all of the players may see the same list of words in their web browser, each of which names a musical genre: blues, jazz, soul, funk, rock, pop, reggae and techno.

Then, each player may click on an icon in a user interface in their web browser to select the word that they think is most applicable to the audio file that is playing. Player A may select 'rock' after only 5 seconds, player B may select 'pop' after 8 seconds, and player C may select 'rock' after 11 seconds. However, note that the audio file may continue to play until the full 15 seconds have elapsed.

As soon as player A selects 'rock,' she can no longer select additional words and this selection is displayed on her computer screen. Similarly, as soon as player B selects 'pop,' he can no longer select additional words and his selection is displayed on his computer screen. Note that the computer screens for players A and B also display each other's selections (i.e., they see one vote for 'rock' and one vote for 'pop').

Finally, when player C selects 'rock' he can no longer select additional words, and his selection is displayed on all of the player's computer screens.

Once all votes have been registered or the music finishes playing, the round ends. Scores are allotted to the players, with player A and C getting more points than player B because there was better agreement between the selections of players A and C (two votes in total) than player B (one vote). Additionally, player A may receive more points than player C because she selected the best word more quickly.

After a brief period to review these scores, the round ends. Then, the scores for the round are added to the players' total scores and the next round begins.

Note that in some embodiments the next round may be a variation on the previous round. For example, a series of related rounds may allow the users to fill in a two-dimensional matrix, such as how danceable a song is versus how relaxing it is.

In some embodiments, user interfaces 300 (FIG. 3A) and 350 include fewer items or additional items. For example, advertising may be displayed during one or more instance of the game. Moreover, a position of at least one item may be changed and/or two or more items may be combined.

We now describe embodiments of a method for generating an aggregate model that specifies a probabilistic relationship between one or more annotation items and a set of audio content. FIG. 4 presents a flowchart illustrating a method 400 for generating an aggregate model that specifies a probabilistic relationship between one or more annotation items and a set of audio content, which may be implemented using a computer system. During operation, the computer system selects audio files associated with one or more annotation items from a group of audio files (410). Then, for each of the audio files, the computer system determines a given model for a given audio file based on the set of audio content associated with the given audio file and the one or more annotation items (412). Note that the given model is independent of models for other audio files in the audio files, and that the given model specifies a probabilistic relationship between the set of audio content associated with the given audio file and the one or more annotation items. Next, the other computer system combines the models for the audio files into the aggregate model (414).

In some embodiments, the computer system optionally determines one or more additional annotation items for an additional audio file that is external to the group of audio files based on the aggregate model (416). Moreover, the computer system may optionally identify one or more audio files in the group of audio files using the aggregate model in response to a query provided by a user (418).

Note that in some embodiments of method 400 there may be additional or fewer operations. For example, the computer system may generate additional aggregate models for additional annotation items in a set of annotation items, where the set of annotation items includes the one or more annotation items. Moreover, the order of the operations may be changed, and two or more operations may be combined into a single operation.

We now describe examples of generating the aggregate model. Continuing the discussion of FIG. 5, a wide variety of supervised learning techniques may be used to determine the model 512. In the discussion that follows, a Gaussian mixture model is used as an illustrative example. However, in other embodiments the supervised learning technique may include: least-squares regression (including correlation), ridge regression, partial least-squares (also referred to as partial correlation), a perceptron algorithm, a Winnow algorithm, linear discriminant analysis (LDA), Fisher discriminant analysis (FDA), logistic regression (LR), a Parzen windows classifier, a (k-) nearest-neighbor classification, multivariate adaptive regression splines (MARS), multiple additive regression trees (MART, a support vector machine (SVM), LASSO (a regularized linear regression technique like ridge regression, but with $L_1$-norm regularization of the coefficients), least angle regression (LARS), decision trees (such as classification and regression tree or CART, with and without gradient boosting, such as ID3 and C4.5), bagging, boosting (such as, adaboost) of simple classifiers, kernel density classification, a minimax probability machine (MPM), multi-class classification, multi-label classification, a Gaussian Process classification and regression, Bayesian statistical analysis, a Naive Bayes classifier, and neural networks for regression and classification. While some of these supervised learning algorithms are linear, it should be understood that one or more additional non-linear versions may be derived using the same 'kernel-methodology,' leading to a spectrum of kernel-based learning methods, for example, kernel FDA, kernelized logistic regression, the kernelized perceptron algorithm, etc. One or more of these non-linear versions may be used to generate one or more models, such as the aggregate model.

When determining a model, the annotation items and associated real-valued weights for a given song may be arranged in a semantic vector. For example, for the song "Fly me to the moon," the semantic vector may be {funk, 0/4, jazz, 3/4, guitar, 4/4, female vocals, 0/4, sad, 2/4, passionate, 1/4}. Additionally, the audio content of the given song may be extracted from a series of time intervals (which may be independent of each other). In some embodiments, MFCCs are used. These coefficients are a lower dimensional representation of a short-term spectrum. Moreover, in some embodiments instantaneous derivatives are also used to encode short time-scale temporal information in the given song. However, numerous other representations of the audio content may be used, including: spectral features, modulation spectra, and/or chromagrams.

Model 512 may be a supervised multi-class labeling model that defines a set of probability distributions between one or more components of the semantic vector and the audio content over the audio feature space. In particular, there may be one Gaussian mixture model, such as model 512, per annotation item or given word w, and this model may define a conditional probability p(x|w), where x is a representation vector that includes the audio content of the given audio file. Moreover, the parameters for the model for the given word may be determined by training on those songs in a group of songs that are positively associated with the given word.

Note that a Gaussian mixture model may be used to model probability distributions over higher dimensional spaces. In particular, a Gaussian mixture model may be expressed as $$p(x|w) = \sum_{r=1}^{R} \pi_r N\left(x|\mu_r, \sum_r\right),$$

where R is the number of components in the model, $\pi_r$ is a weight, N is a Gaussian having a mean $\mu_r$ and a standard deviation or covariance $\Sigma_r$. As noted previously, the parameters may be determined using an expectation maximization technique.

Continuing the discussion of FIG. 6, once independent Gaussian mixture models have been determined for each song in a group of songs (and, more generally, for a group of audio files), they may be combined to produce an aggregate model for the given word, for example, by using the mixture hierarchies 612 expectation maximization technique. This approach may be computationally efficient for parameter estimation and inference, and may offer a smoothed representation that provides a better density estimate than many other techniques.

In an exemplary embodiment, a group of audio flies may include audio files (such as songs) and there may be 174 annotation items. For a given annotation item (such as a word), the set of associated audio files (a set of 10-500 songs) are used to create a set of independent models (e.g., a set of 10-500 models). Note that the audio content in each audio track or song may be represented by a large set of feature vectors (a set of about 20,000 features or 5200 39-dimensional vectors for a 4-minute long song) to create the model. Then, the set of independent models may be combined to generate a aggregate model for a given annotation item or word.

Based on the aggregate models for a group of audio files, annotation items may be determined for additional audio files that were not included in the online game. In particular, computer system 100 (FIG. 1) may leverage the aggregate models to automatically annotate novel (unclassified) audio files. Thus, computer system 100 (FIG. 1) may perform automated annotation to analyze and understand audio signals, for example, using digital signal process, statistical modeling, and machine-learning methods to model semantic data, such as annotation items, for an unclassified audio file.

In an exemplary embodiment, a digital audio signal is processed and its audio content is represented by numerical features that can be easily interpreted by a computer system, such as computer system 100 (FIG. 1). For example, a digital audio signal can be represented by: the numerical values of the discrete samples that make up a digital audio waveform, by the bytes that make up a compressed audio file (e.g., using the MPEG-1 Audio Layer or 'MP3' standard), and/or by the amount of energy present in the signal at various auditory frequencies. Note that representing audio content as numerical features permits automatic machine analysis of the audio file, such as automated annotation.

Using a feature-based representation of the audio file, statistical algorithms can extract patterns from these features. In particular, given semantic words and phrases that describe the audio file, patterns can be associated based on a large number of audio-file examples that are associated with semantic descriptions. Moreover, as more and more data is collected, certain patterns become more strongly associated with certain descriptions. In this way, computer system 100 (FIG. 1) can 'learn' how to associate words with audio content. For example, just as a human listener can be taught to recognize the sound of a saxophone by listening to examples of saxophones and by being told that the word used to describe that instrument is saxophone, computer system 100 (FIG. 1) can also be 'trained' to identify audio patterns distinctive of a saxophone when given enough accurately labeled audio examples of the sound of saxophones.

In order for computer system 100 (FIG. 1) to identify audio patterns and to associate them with appropriate semantic descriptions, this computer system may be first trained on a large number of accurately labeled examples. By collecting a large dataset of audio content that humans have accurately associated with semantic phrases, computer system 100 (FIG. 1) may be able to describe audio content with semantic phrases as accurately as humans. In particular, once the computer system 100 (FIG. 1) has learned the relationship between audio content and semantic descriptions, it can generalize this knowledge and annotate new audio content that has not been labeled or even listened to by humans. In this way, computer system 100 (FIG. 1) can annotate massive databases of audio files, without the expense and/or delays associated with human annotation.

In an exemplary embodiment, a new song may be segmented into 20,000 time intervals and audio content (such as the MFCCs) may be determined in a 39-dimensional space. Then, 20,000 probabilities of a match with a particular Gaussian mixture model (and, more generally, with a particular aggregate model) may be determined. In particular, given the resulting representation vector x, the probability of each word or annotation item in the song is $$p(w|x) = \frac{p(x|w)p(w)}{p(x)},$$

which can be evaluated using the previously determined conditional probabilities p(x|w) if the representation vectors are conditionally independent for a given word, and if the probability of a word p(w) and of a given representation vector p(x) are known. Note that if the average of these results indicates a good match, the aggregate models may be used to determine the annotation items associated with the new song.

Figure 7:
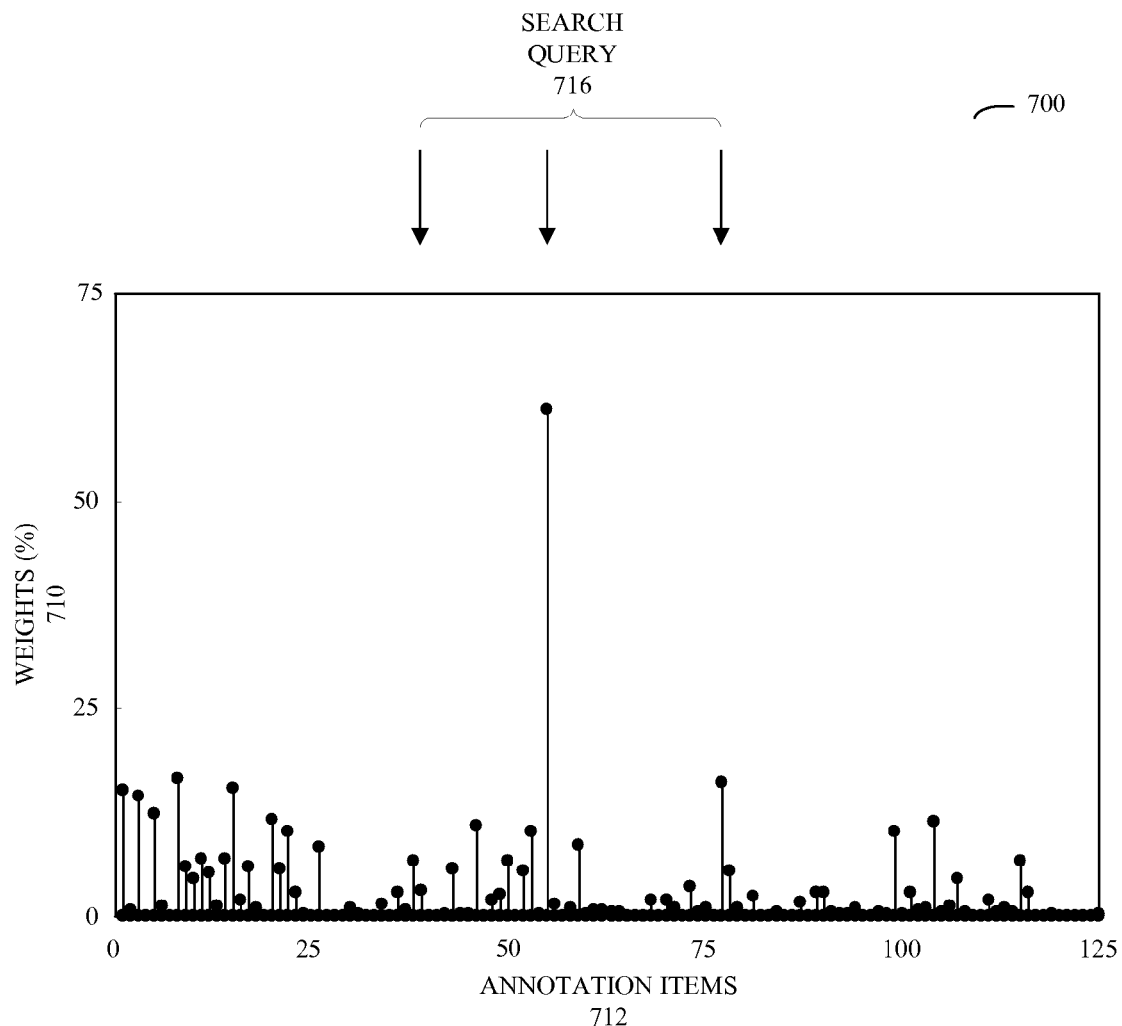
FIG. 7 is a graph illustrating annotation items associated with an audio file in accordance with an embodiment of the present invention.

The result of this automated-annotation process is shown in FIG. 7, which presents a graph 700 illustrating annotation items 712 and associated weights 710 for an audio file. Note that a given weight (which is typically non-zero) associated with a given annotation item in the annotation items 712 is p(w|x). Moreover, note that the given weight indicates a likelihood of an association between the given annotation item and the given audio file.

Computer system 100 (FIG. 1) may also be used to identify audio that is already described by semantic phrases. In particular, the index of documents and the aggregated models may be used for: audio search, audio retrieval, and/or to provide recommendations. For example, as is also illustrated in FIG. 7, a user may provide a search query 716 that includes semantic information. Based on this search query, computer system 100 (FIG. 1) may return audio files that are a good match. Note that phrases or words in search queries may be added to the pre-determined list of annotation items, thereby expanding the vocabulary 122 (FIG. 1) used in subsequent games.

In an exemplary embodiment, the weights or probabilities p(w|x) for a given word to occur in the audio files in a group of audio files are used to determine a probability vector $p_w$. Then, given a text-based search query, a query multinomial may be determined, where $q_w$ equals 1/|w| if the given word is included in the search expression and zero otherwise. Next, the audio files may be ranked using the Kullback-Leibler divergence $$KL = \sum_w q_w \log \frac{q_w}{p_w}.$$

For example, in response to a search query for 'tender', 'pop', and 'female vocal lead', Shakira's song "The One," Alicia Keys song "Fallin," and Evanescence's song "My Immortal" may be identified.

In some embodiments, a user may provide a query that includes audio content to computer system 100 (FIG. 1). This audio content may be annotated and audio content having similar semantic descriptions or annotation items may be identified. This technique is sometimes referred to as query by example.

As noted previously, computer system 100 (FIG. 1) may also facilitate personalized search. This can be useful because descriptions of audio and, in particular, music can be very subjective. That is, a person's perception and rating of audio content may differ due to unique factors such as: age, geography, cultural background, education, and/or musical tastes. For this reason, different people may require different audio search and recommendation engines that have been tailored to their personal tastes.

One approach to implementing personalized search is to use registration information. For example, registration information may be collected from players during the online game. In this way, annotation items collected from each player can be associated with their identifying characteristics. Using this information, the collected annotation items may be filtered based on a number of user characteristics to create personalized subsets. These subsets may be used to develop distinct aggregate models, which can be used to facilitate personalized searches and recommendations.

For example, computer system 100 (FIG. 1) may train models only using data collected from 18-to-24 year old Californians. These aggregate models may be used to recommend audio content to individuals within the state. This may be advantageous in excluding the annotation items (such as, musical tastes) from particular demographic groups, such as residents in the Midwest who are older than 50. In this way, computer system 100 (FIG. 1) can provide results and/or recommendations that are tailored to one or more specific groups. Note that this approach may be generalized for use with very narrow user demographics, such as a single individual.

In addition to using personal information (e.g., age, gender, nationality, profession, and/or income) to segment the collected annotations items into specific subsets, users may also provide relevant information about their audio tastes that can be used to adapt their personalized search and recommendation engines. For example, in order to improve a personalized music recommendation engine, a user may indicate their favorite: artists, songs, play lists or specific attributes for incorporation into a computer audition system, such as computer system 100 (FIG. 1), that truly reflects the listener who created it.

Note that in addition to providing personal music recommendations and/or search results, demographic data and annotation items may be used to provide sound-based recommendations to third parties. For example, computer system 100 (FIG. 1) can be used to help record producers evaluate which artist or song to promote or to help advertisers pick the most effective jingle for a new product line. Thus, computer system 100 (FIG. 1) may be used as a testing platform or vehicle for consumer sentiment.

A variety of metrics may be used to assess the performance of computer system 100 (FIG. 1), including precision (the number of songs correctly annotated with a given word divided by the number of songs annotated with the given word) and recall (the number of songs correctly annotated with the given word divided by the number of songs that should have been annotated with the given word). If 500 songs are annotated using 10 words in a vocabulary of 174 words using computer system 100 (FIG. 1), the precision may be 0.27 and the recall may be 0.16. This is better than the results with random annotation, which results in a precision of 0.14 and a recall of 0.06, and is comparable to human annotation, which results in a precision of 0.30 and a recall of 0.15.

A metric for search performance is the area under the receiver-operator-characteristic curve. Note that the receiver-operator-characteristic curve is a plot of the true-positive rate as a function of the false-positive rate in a ranked list of songs or audio files. The integrated area under this curve is a scalar between 0 and 1 (where 0.5 is the expected value for random guesses). Using 1, 2 or 3 word queries with 5 or more examples or instances, the area under the receiver-operator-characteristic curve may be 0.71, 0.72 and 0.73, respectively.

Figure 8:
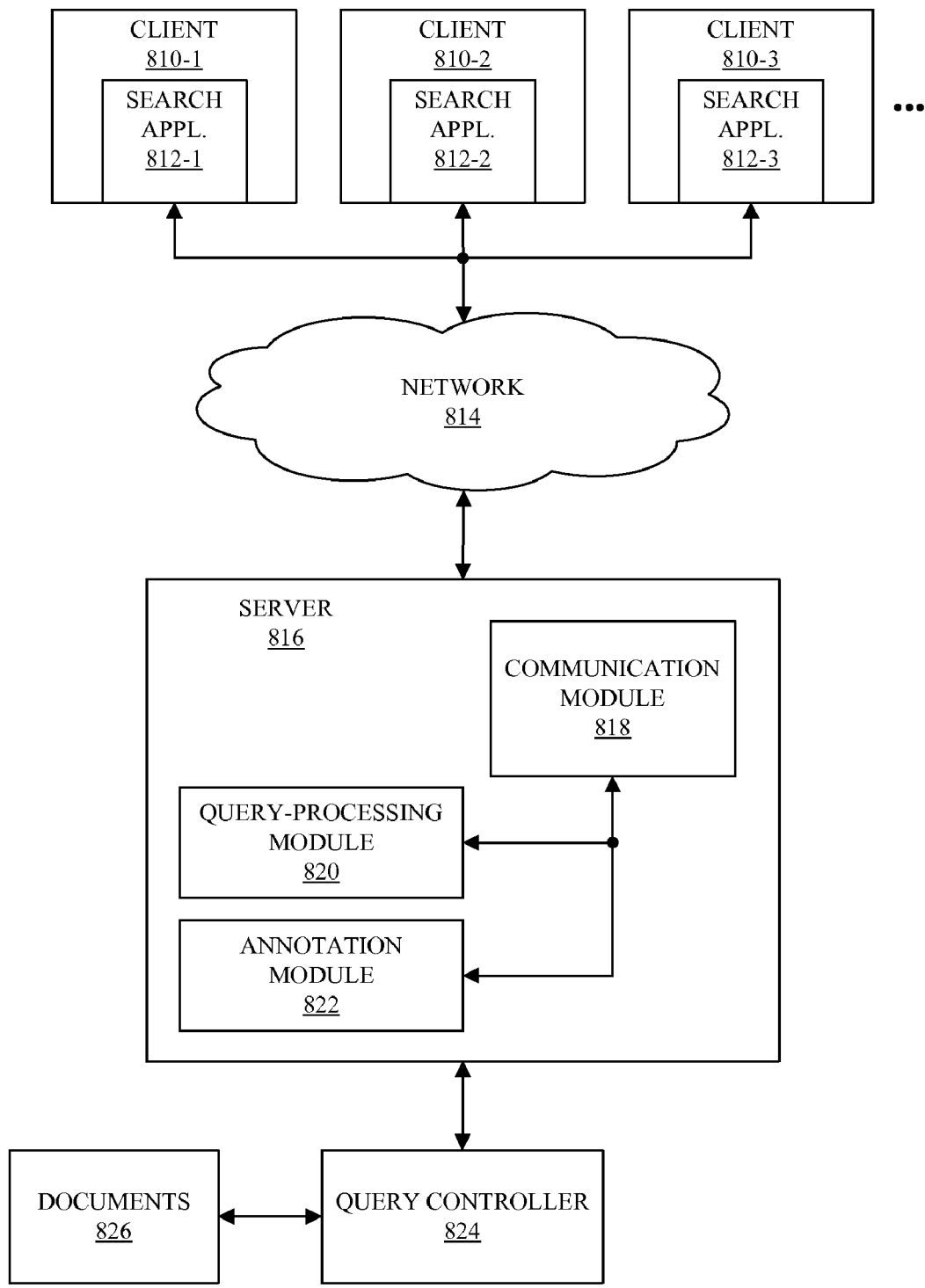
FIG. 8 is a block diagram illustrating a search engine in accordance with an embodiment of the present invention.

We now describe embodiments of systems and devices that may determine and/or may use the aggregate models. FIG. 8 provides a block diagram illustrating a search engine 800 in accordance with an embodiment of the present invention. Search engine 800 receives queries from one or more clients 810, identifies one or more matching documents or files in an index of documents 826 (which may include multiple audio files), and provides the search results to the one or more clients 810. Note that each of the clients 810 may include a search application 812, which is described further below with reference to FIG. 10.

Search engine 800 may be used to retrieve information on the Internet and/or on an intranet, e.g., for locating documents stored on servers or other hosts on a communication network 814. The retrieved information may include matching documents (such as audio files), portions of matching documents, and/or rankings of results.

Note that search engine 800 may be implemented as a distributed system that includes multiple servers, such as server 816, each of which is configured to process search queries, such as a query for an audio file (which may include text, audio, images and/or video). These servers may be distributed over a wide geographic area. Queries submitted by a user at a client, such as client 810-1, may be routed to an appropriate server, such as the server 816, based on: the user's location, a number of servers that are currently in operation, and/or an overall usage of the search engine 800.

Servers, such the server 816, may be coupled to the communication network 814 via a communication module 818. Note that the communication network 814 may include: the Internet, an intranet, a LAN, and/or a WAN. In embodiments where the server 816 is a web server, server 816 may receive query requests and provides search results in the form of web pages that are compatible with: a HyperText Transfer Protocol (HTTP), an Extensible Markup Language (XML), and/or a similar protocol. Moreover, these web pages may include embedded audio files or links to audio files in the index of documents 826.

Server 816 may include a query-processing module 820 for managing the processing of queries by one or more query controllers, such as query controller 824. For example, query-processing module 820 may generate a search expression based on a search query. This search expression may include additional information that the initial query, such as synonyms or annotation items (see below) that may be used to identify matching documents in the index of documents 826, for example, based on a matching score with the search expression. In addition, the server 816 may include an annotation module 822 to generate the annotation items for audio content in the queries.

Query controllers, such as the query controller 824, may be coupled to the index of documents 826. Moreover, query controller 824 may be configured to receive search expressions from the server 816, to identify matches, and to determine matching scores.

Using the identified matches and matching scores, the query-processing module 820 may provide results to the user. For example, a ranking (i.e., an ordered list of search results) may be provided to the user. In addition, the query-processing module 820 may instruct the query controller 824 to retrieve the corresponding documents from the index of documents 826, which may then be provided to the user. Note that in some embodiments only a subset of the results is presented to the user.

Search engine 800 may include fewer components or additional components. Moreover, two or more components may be combined into a single component, and/or a position of one or more components may be changed. In addition, functions of the search engine 800 may be implemented in hardware and/or in software. These functions may be distributed over fewer or more servers and devices, which may be located at one or more locations. Furthermore, functions in the search engine 800 may be implemented at a lower level or at a higher level in the system hierarchy.

Figure 9:
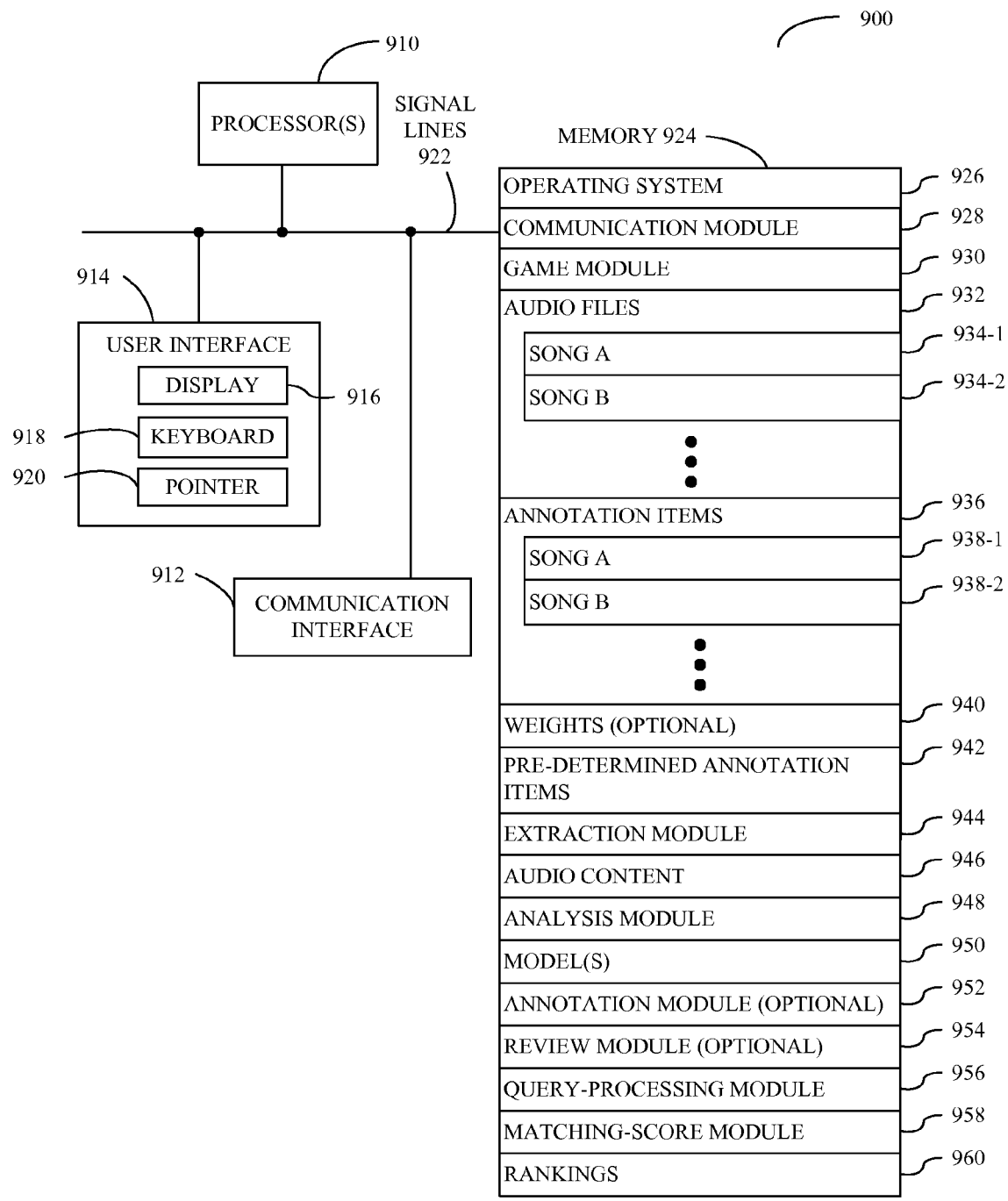
FIG. 9 is a block diagram illustrating a computer system in accordance with an embodiment of the present invention.

FIG. 9 presents a block diagram illustrating a computer system 900. Computer system 900 includes: one or more processors 910, a communication interface 912, a user interface 914, and one or more signal lines 922 coupling these components together. Note that the one or more processing units 910: may support parallel processing and/or multi-threaded operation, the communication interface 912 may have a persistent communication connection, and the one or more signal lines 922 may constitute a communication bus. Moreover, the user interface 914 may include: a display 916, a keyboard 918, and/or a pointer 920, such as a mouse.

Memory 924 in the computer system 900 may include volatile memory and/or non-volatile memory. More specifically, memory 924 may include: ROM, RAM, EPROM, EEPROM, Flash, one or more smart cards, one or more magnetic disc storage devices, and/or one or more optical storage devices. Memory 924 may store an operating system 926 that includes procedures (or a set of instructions) for handling various basic system services for performing hardware-dependent tasks. While not explicitly indicated in the computer system 900, in some embodiments the operating system 926 includes a web browser. Memory 924 may also store procedures (or a set of instructions) in a communication module 928. These communication procedures may be used for communicating with one or more computers and/or servers, including computers and/or servers that are remotely located with respect to the computer system 900.

Memory 924 may also include multiple program modules (or a set of instructions), including: game module 930 (or a set of instructions), extraction module 944 (or a set of instructions), analysis module 948 (or a set of instructions), optional annotation module 952 (or a set of instructions), optional review module 954 (or a set of instructions), query-processing module 956 (or a set of instructions), and/or matching-score module 958. As described previously, game module 930 may allow multiple players to provide annotation items 936 (such as those for song A 938-1 and/or song B 938-2) for audio files 932 (such as song A 934-1 and/or song B 934-2). For example, during an instance of the game, players may select annotation items 936 for a given song from pre-determined annotation items 942. Note that by selecting the annotation items 936 the players may define optional weights 940 that specify a relationship between the annotation items 936 and the audio files 932.

Extraction module 944 may be used to determine audio content 946 (such as MFCCs) from the audio files 932. Then, analysis module 948 may determine statistical or probabilistic models 950 (such as aggregate models) that relate the audio content 946 and the annotation items 936 for one or more audio files 932.

These models may be used to enable a variety of applications. For example, the models 950 may be used by optional annotation module 952 to automatically annotate additional audio files, which were not included in the game. Moreover, optional review module 954 may use the models 950 to generate music reviews for audio files, such as audio files 932.

Additionally, query-processing module 956 may use the models 950 to perform audio search. For example, query-processing module 956 may determine a search expression based on a search query received from a user. Then, matching-score module 958 may determine matching scores between the search expression and the audio files 932. Based on these matching scores, query-processing module 956 may determine and/or return results, such as rankings 960, to the user.

Instructions in the various modules in the memory 924 may be implemented in: a high-level procedural language, an object-oriented programming language, and/or in an assembly or machine language. Note that the programming language may be compiled or interpreted, e.g., configurable or configured to be executed by the one or more processing units 910.

Although the computer system 900 is illustrated as having a number of discrete items, FIG. 9 is intended to be a functional description of the various features that may be present in the computer system 900 rather than a structural schematic of the embodiments described herein. In practice, and as recognized by those of ordinary skill in the art, the functions of the computer system 900 may be distributed over a large number of servers or computers, with various groups of the servers or computers performing particular subsets of the functions. In some embodiments, some or all of the functionality of the computer system 900 may be implemented in one or more application-specific integrated circuits (ASICs) and/or one or more digital signal processors (DSPs).

Computer system 900 may include fewer components or additional components. Moreover, two or more components may be combined into a single component, and/or a position of one or more components may be changed. In some embodiments, the functionality of the computer system 900 may be implemented more in hardware and less in software, or less in hardware and more in software, as is known in the art.

Figure 10:
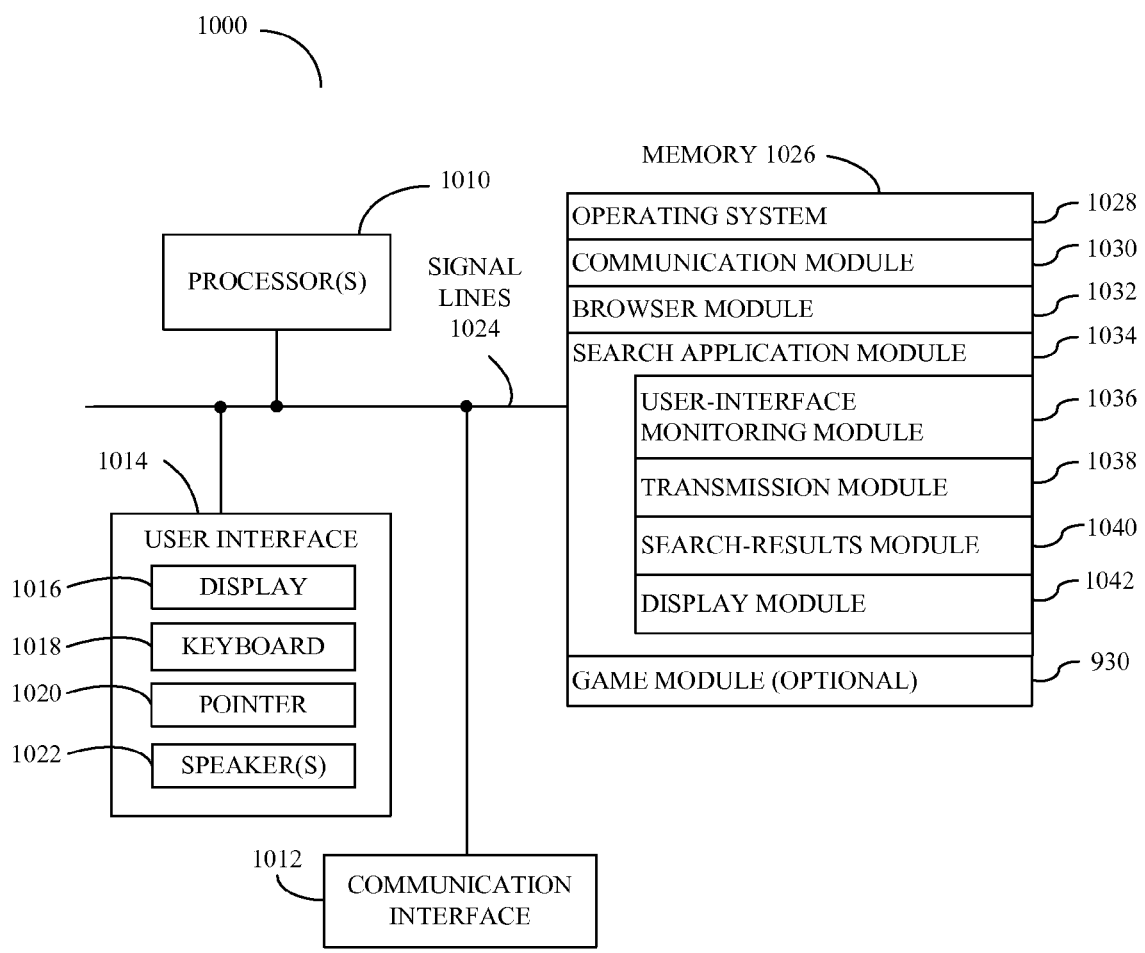
FIG. 10 is a block diagram illustrating a client computer in accordance with an embodiment of the present invention.

FIG. 10 presents a block diagram illustrating a client computer 1000, such as one of the client computers 810 (FIG. 8), in accordance with an embodiment of the present invention. This client computer may include: a personal computer, a laptop computer, cell phone, PDA, and/or other device capable of manipulating computer-readable data. Client computer 1000 may include: one or more processors 1010, a communication interface 1012 for communicating with other computers, servers and/or clients, a user interface 1014, a memory 1026, and one or more signal lines 1024 for coupling these components to one another. Note that the one or more processing units 1010 may support parallel processing and/or multi-threaded operation, the communication interface 1012 may have a persistent communication connection, and the one or more signal lines 1024 may constitute a communication bus. Moreover, the user interface 1014 may include: a display 1016, a keyboard 1018, a pointer 1020 (such as a mouse), and/or speakers 1022.

Memory 1026 in the client computer 1000 may include volatile memory and/or non-volatile memory. More specifically, memory 1026 may include: ROM, RAM, EPROM, EEPROM, Flash, one or more smart cards, one or more magnetic disc storage devices, and/or one or more optical storage devices. Memory 1026 may store an operating system 1028 that includes procedures (or a set of instructions) for handling various basic system services for performing hardware dependent tasks. Memory 1026 may also store procedures (or a set of instructions) in a communication module 1030. These communication procedures may be used for communicating with one or more computers and/or servers, including computers and/or servers that are remotely located with respect to the client computer 1000. In addition, the communication procedures may be used for communicating with a search engine, such as the search engine 800 (FIG. 8).

Memory 1026 may also include multiple program modules (or a set of instructions), including a browser module 1032 (or a set of instructions), search application module 1034 (or a set of instructions), and/or optional game module 930 (or a set of instructions). Note that the browser module 1032 may include functionality, such as: an embedded audio player, audio recommendation, and/or audio purchase options.

Search application module 1034 may include: a user-interface monitoring module 1036 (or a set of instructions) for monitoring user input, a transmission module 1038 (or a set of instructions) for sending a query, a search-results module 1040 (or a set of instructions) for receiving search results, and a display module 1042 (or a set of instructions) for displaying search results.

Client computer 1000 may include fewer components or additional components. Moreover, two or more components may be combined into a single component, and/or a position of one or more components may be changed. For example, in embodiments where the client computer 1000 is coupled to a local server, one or more of the modules and/or applications in the memory 1026 may be stored in a server computer at a different location than the user. In addition, the various modules and sub-modules may be rearranged and/or combined. As an illustration, in some embodiments the search application module 1034 may be integrated into the browser module 1032.

As noted previously, at least a portion of optional game module 930 may be implemented as a stand-alone software application, or as a program module or subroutine in another application, such as the browser module 1032. In particular, optional game module 930 may be resident on client computer 1000. However, other embodiments may use a game tool that is embedded in a web page (once again, either as a stand-alone application or as a portion of another application). This web page may be provided by a server, such as computer system 900 (FIG. 9) via a network. In an illustrative embodiment, the game tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the game tool may include programs or procedures containing: JavaScript, ECMAScript instructions, VBScript instructions, or instructions in another programming language suitable for rendering by a browser or another client application on the client computer 1000.

We now discuss embodiments of data structures that may be used in computer system 100 (FIG. 1) and/or 900 (FIG. 9). FIG. 11 presents a block diagram illustrating a data structure 1100. This data structure may include multiple songs 1110 and annotation items. For example, song 1110-1 may include multiple pairs of annotation items 1112 and associated weights 1114.

FIG. 12 presents a block diagram illustrating a data structure 1200. This data structure may include aggregate models 1210. A given aggregate model, such as aggregate model 1210-1, may include one or more components 1212 (such as Gaussians and/or associated weights) and associated moments 1214 (such as means and/or standard deviations in a multi-dimensional space).

Note that that in some embodiments of the data structures 1100 (FIG. 11) and 1200 there may be fewer or additional components. Moreover, two or more components may be combined into a single component and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for characterizing songs, wherein the method comprises:
   providing interactive environments that include games, having predetermined durations, in which training songs are played to groups of users and associated annotation items are dynamically received from the groups of users, wherein the annotation items include words that characterize the training songs, wherein at least an annotation item received from a given user in a given group of users includes an extrema in characterizing a given training song;
   wherein, in a given interactive environment, the given training song is played to users in the given group of users, the annotation items are dynamically received from the users, and the annotation items received from other users in the given group of users during a given game is provided to the given user; and
   wherein a score of the given user during the given game is based on attempts of the given user to match his provided annotation items to those of a majority of the given group of users within a time limit;
   using the computer, determining models that specify statistical relationships between the training songs and the received annotation items, wherein a given model specifies a probability that a given annotation item is associated with the given training song;
   aggregating the models into compound models that specify the statistical relationships between the training songs and the annotation items, wherein a given compound model identifies subsets of the training songs that are associated with the given annotation item; and
   determining the annotation items associated with additional songs based on the compound models, wherein the determining characterizes the additional songs, and wherein the annotation items associated with the additional songs were not previously determined in the interactive environments.

2. The method of claim 1, further comprising providing a reward to the given user in the given group of users based on agreement between one or more of the annotation items received from the given user and those of the majority of the given group of users.

3. The method of claim 1, further comprising providing feedback to the given user in the given group of users based one or more of the annotation items received from the given user and those of the majority of the given group of users.

4. The method of claim 1, wherein the one or more annotation items include semantic labels.

5. The method of claim 1, wherein, for the given user in the given group of users, receiving the one or more annotation items involves the given user selecting one or more annotation items from pre-determined annotation items.

6. The method of claim 5, wherein the pre-determined annotation items are determined from a document associated with the audio file.

7. The method of claim 6, wherein the document includes a review of the audio file.

8. The method of claim 5, wherein the pre-determined annotation items include types of music, emotions, descriptions of vocals, types of musical instruments, descriptions of musical styles, and rhythms.

9. The method of claim 1, further comprising repeating the given interactive environment for the given training song multiple times prior to determining the given model.

10. The method of claim 1, wherein the given model specifies the probability that a given annotation item is associated with content of the given training song.

11. The method of claim 10, wherein the content includes audio content.

12. The method of claim 1, wherein the given compound model corresponds to a joint distribution.

13. A computer-program product for use in conjunction with a computer system, the computer-program product comprising a non-transitory computer-readable storage medium and a computer-program mechanism embedded therein to characterize songs, the computer-program mechanism including:
   instructions for providing interactive environments that include games, having predetermined durations, in which training songs are played to groups of users and associated annotation items are dynamically received from the groups of users, wherein the annotation items include words that characterize the training songs, wherein at least an annotation item received from a given user in a given group of users includes an extrema in characterizing a given training song;
   wherein, in a given interactive environment, the given training song is played to users in the given group of users, the annotation items are dynamically received from the users, and the annotation items received from other users in the given group of users during a given game is provided to the given user; and
   wherein a score of the given user during the given game is based on attempts of the given user to match his provided annotation items to those of a majority of the given group of users within a time limit;
   instructions for determining models that specify statistical relationships between the training songs and the received annotation items, wherein a given model specifies a probability that a given annotation item is associated with the given training song;
   instructions for aggregating the models into compound models that specify the statistical relationships between the training songs and the annotation items, wherein a given compound model identifies subsets of the training songs that are associated with the given annotation item; and
   instructions for determining the annotation items associated with additional songs based on the compound models, wherein the determining characterizes the additional songs, and wherein the annotation items associated with the additional songs were not previously determined in the interactive environments.

14. The computer-program product of claim 13, wherein the computer-program mechanism includes instructions for providing feedback to the given user in the given group of users based one or more of the annotation items received from the given user and those of the majority of the given group of users.

15. The computer-program product of claim 13, wherein the computer-program mechanism includes instructions for repeating the given interactive environment for the given training song multiple times prior to determining the given model.

16. The computer-program product of claim 13, wherein the given model specifies the probability that a given annotation item is associated with content of the given training song.

17. The computer-program product of claim 16, wherein the content includes audio content.

18. The computer-program product of claim 13, wherein the given compound model corresponds to a joint distribution.

19. A computer system, comprising:
- a processor;
- a memory;
- a program module, wherein the program module is stored in the memory and configured to be executed by the processor to characterize songs, the program module including:
- instructions for providing interactive environments that include games, having predetermined durations, in which training songs are played to groups of users and associated annotation items are dynamically received from the groups of users, wherein the annotation items include words that characterize the training songs, wherein at least an annotation item received from a given user in a given group of users includes an extrema in characterizing a given training song;
- wherein, in a given interactive environment, the given training song is played to users in the given group of users, the annotation items are dynamically received from the users, and the annotation items received from other users in the given group of users during a given game is provided to the given user; and
- wherein a score of the given user during the given game is based on attempts of the given user to match his provided annotation items to those of a majority of the given group of users within a time limit;
- instructions for determining models that specify statistical relationships between the training songs and the received annotation items, wherein a given model specifies a probability that a given annotation item is associated with the given training song;
- instructions for aggregating the models into compound models that specify the statistical relationships between the training songs and the annotation items, wherein a given compound model identifies subsets of the training songs that are associated with the given annotation item; and
- instructions for determining the annotation items associated with additional songs based on the compound models, wherein the determining characterizes the additional songs, and wherein the annotation items associated with the additional songs were not previously determined in the interactive environments.

\* \* \* \* \*